Dec. 17, 1968  F. V. KADRI  3,417,256
REGULATED POWER SUPPLY COMPRISING A PLURALITY
OF ISOLATED SYSTEMS
Filed May 31, 1966  2 Sheets-Sheet 1

INVENTOR
F. V. KADRI
BY John P. McDonnell
ATTORNEY

United States Patent Office 3,417,256
Patented Dec. 17, 1968

3,417,256
REGULATED POWER SUPPLY COMPRISING A PLURALITY OF ISOLATED SYSTEMS
Fred V. Kadri, Madison, N.J., assignor to Bell Telephone Laboratories, Incorporated, Murray Hill, N.J., a corporation of New York
Filed May 31, 1966, Ser. No. 554,092
7 Claims. (Cl. 307—43)

This invention relates to magnetic regulated power supplies and, more particularly, to high reliability power supplies comprising a plurality of isolated systems.

In many communication systems, it is important to employ a power supply system which will supply a direct current of a constant magnitude to a given load. It is often desirable that this power supply system possess an extremely high degree of reliability and maintain a constant output current free of transients which may destroy the equipment being supplied or, minimally, introduce communication disruptive noise into the overall system.

Such a power supply system may be employed, for example, to supply power to the repeaters in a submarine cable system. In such a system, it is essential that the output current be held to a constant magnitude with an order of stability higher than one percent. In addition to this stability, the reliability of a continuous supply is also of prime importance. A power loss or failure, in addition to causing a total loss of service, would result in cooling and subsequently reheating of the repeaters which could tend to reduce the life of the repeaters.

In the past, systems having the desirable high degree of reliability and ability to provide a transient-free output current of constant magnitude were realized by both the parallel and series combination of a plurality of input sources. In the parallel combination, a plurality of input sources, each capable of supplying the load, are connected in parallel to provide the necessary high degree of reliability through redundancy. In the series combination, the sources are connected in series with an individual diode connected across each of the output terminals of each source to bypass the source in the event of a failure therein. Once the bypass diode is biased into conduction by the remaining sources to effectively remove the failed source from the power supply system, the remaining series sources then have the capability of supplying the load for a relatively short-term interval sufficient to repair or replace the failed source. Both the parallel and series systems have the disadvantages of high cost, unwarranted redundancy for reliability, transient switching voltages which may be destructive or, minimally, introduce undesirable noise, and restriction to input sources which have similar current, voltage, and power ratings.

It is, therefore, an object of this invention to provide a reliable constant current power supply which is substantially free of transients.

It is another object of this invention to provide a reliable power supply which may employ input sources having dissimilar current, voltage, and power ratings.

The present invention employs a plurality $n$ of A.C. input sources, each of which is serially connected with its own pair of saturable reactor gate windings and its own output transformer primary winding. The primary windings of the output transformer are each wound on individual cores while the secondary winding is wound on every core. The control of the series loop by the saturable reactor, which is preferably operated in the constrained mode, causes the circuit to simulate the series combination of sources of the prior art, even though each of the input sources is completely isolated from the remaining sources. The isolation provided by the saturable reactor and output transformer eliminates the presence of destructive transients and reduces transients of a lesser magnitude to a level sufficient to significantly reduce the communication disruptive noise normally introduced by these transients. Further advantages of the present invention reside in the ability to combine sources of dissimilar current, voltage, and power ratings and, in addition, still provide a power system with a constant current output despite variations in supply voltage, supply frequency, and load impedance. Compensation for these latter variations is inherently provided by the saturable reactor which automatically adjusts the interval (phase delay) by which the source voltage leads the current in each of the series loops.

Other objects and features of the present invention will become apparent upon consideration of the following detailed description when taken in connection with the accompanying drawings in which.

Figure 1:
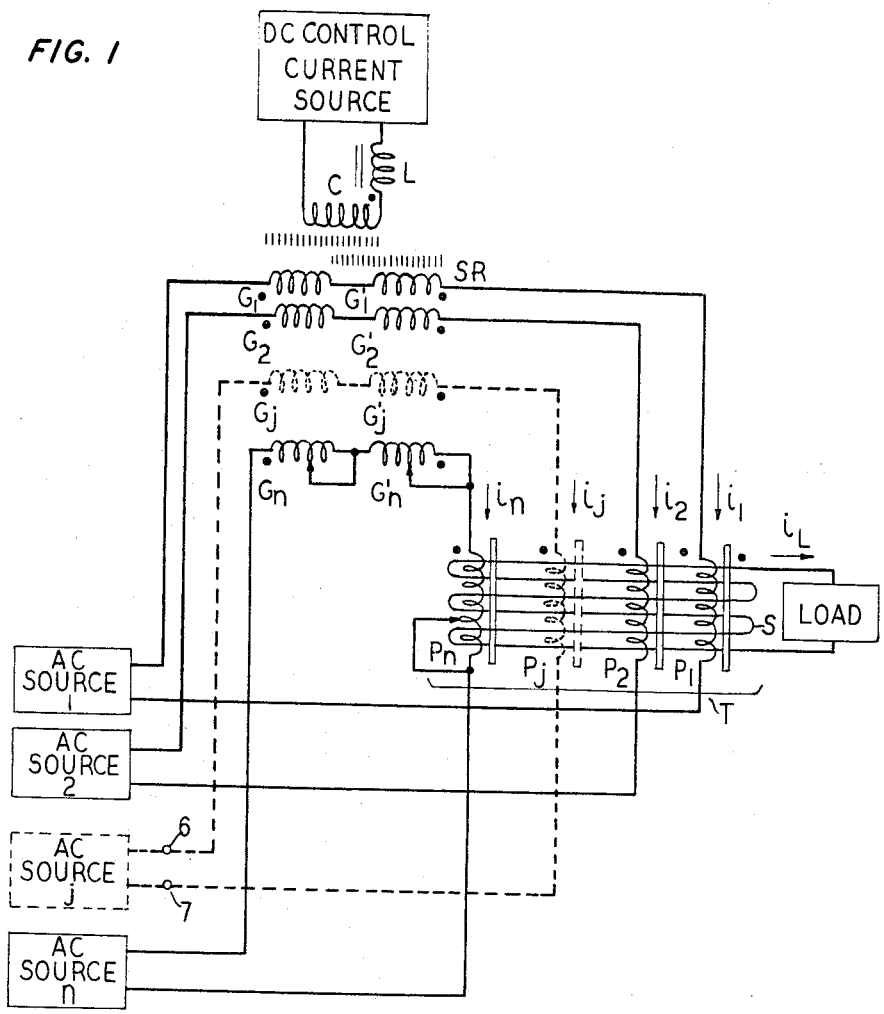
FIG. 1 is a schematic diagram of an embodiment of the invention.

As can be seen from FIG. 1 of the drawing, each of the A.C. input sources 1 through $n$ has two similar gate windings $G_{subscript}$ and $G'_{subscript}$, of the saturable reactor SR, and a primary winding $P_{subscript}$, of output transformer T, serially connected with its output terminals. The saturable reactor SR therefore has $2n$ gate windings wound thereon with $n$ windings wound on each of its two saturable cores. The primary winding C of saturable reactor SR is coupled to both cores and hence to each of the gate windings G and G'. A constraining inductor L is serially connected with the D.C. control current source and the primary winding C of saturable reactor SR. The output transformer T has $n$ primary windings, each of which is wound about an individual linear core. The secondary winding S of output transformer T has each of its turns coupled to each of the primary windings $P_1$ through $P_n$. Secondary winding S is connected to the load.

In the present invention, the A.C. input sources 1 through $n$ are combined to provide regulated current to a variable load using a single multiwinding saturable reactor control element SR and a single multiwinding and multicore output transformer T. The resulting combination of the sources simulates a straightforward series connection of sources, and at the same time, the saturable reactor and output transformer electrically isolate the sources from one another. In a preferred embodiment of the invention, inductor L will be serially connected with the D.C. control current source and the primary winding C of saturable reactor SR to restrict operation of this reactor to the highly constrained mode, i.e., the inductor L will limit the A.C. current induced in the primary winding C from the gate windings G, G' to a negligible level. This limiting effect "constrains" the operation of the reactor SR so that it is responsive almost completely to the predetermined D.C. current of the control source and prevents a cumulative ripple amplification and regeneration. The output transformer T also provides electrical isolation between the A.C. output sources since each primary winding is wound on its own individual core. The turns ratio of output transformer T may be adjusted, as illustrated by winding $P_n$, to obtain any desired input-output voltage ratio.

In a series connected saturable reactor such as SR, the control and gate (load) current can be made proportional over a wide range of control currents from the control D.C. source. For any given D.C. control current, the gate current will remain constant despite variations in supply voltage, supply frequency, and load impedance. In the present invention, saturable reactor SR represents a departure from the series saturable reactors of the prior art in that instead of a single gate winding split evenly between a pair of cores, a plurality of such gate windings are employed. The gate windings may be wound in parallel for uniformity of turns and coupling. As illustrated by the taps on the winding associated with input source $n$, with appropriate adjustment of the turns among the multiple gate windings of the saturable reactor SR and among the primary windings of the output transformer T, it is possible to combine A.C. input sources of dissimilar current, voltage, and power ratings, and still share the load current equally between the input sources. Regardless of the source voltage levels, the current flowing in each of the series loops will remain constant for any constant output current level, as discussed in detail hereinafter.

Figure 2:
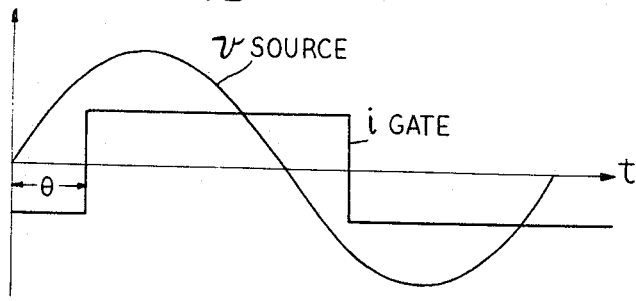
FIG. 2 illustrates a voltage and a current waveform useful in describing the invention.

The action of the saturable reactor SR in the present circuit is perhaps most easily explained by assuming, for purposes of illustration only, that the voltage output of each of the A.C. sources 1 through $n$ is a sinusoid. The inherent action of the constrained series saturable reactor is to furnish a square wave of gate current whose magnitude is proportional to the D.C. control current. As illustrated in FIG. 2, the sinusoid represents the output voltage of the A.C. input source $j$, for example, while the square wave represents the current flow through the gate windings ($G_j$ and $G'_j$) of the saturable reactor SR and the primary winding ($P_j$) of the output transformer. The square wave gate current is symmetrical with respect to the time $t$ axis or abscissa. As discussed hereinafter, the saturable reactor SR when operating in the constrained mode will inherently introduce a time or phase delay $\theta$ by which the gate current in the series loop connected to input A.C. source $j$ will lag the sinusoidal voltage of the A.C. input source $j$. The current through each of the gate windings G and G' will, therefore, by a symmetrical square wave having a constant amplitude predetermined by the output current of the control D.C. source but which is independent of the input source voltage, frequency, and load impedance.

As noted heretofore, the output transformer T is a multicore design with one core and one primary winding wound thereon for each input source. Each of the turns of the secondary winding S is wound upon each of the cores. The potential induced in the secondary winding S is, therefore, the sum of the primary voltages times the turns ratio of the windings. Each primary voltage is, in turn, a function of the output voltages of all the A.C. input sources, and the reflected load impedance. The saturable reactor SR maintains a constant current in the series loops, however, and these voltage variations in any given loop have no effect on the output current, as discussed hereinafter. These relationships concerning the output transformer assume, of course, that transformer T is only operated in the linear mode and the individual primary cores are therefore never saturated.

When all the A.C. input sources are operative the turns ratios of the windings of transformer T are designed to provide a desired load current. If the output of a particular input source should become short-circuited, the primary voltages in the loops comprising the remaining A.C. input sources would increase and, through transformer action, this increase in voltage will be reflected across the primary winding of the loop which includes the failed source to provide the saturable reactor gate winding voltages in that loop. This compensatory action of transformer T preserves the magnetic equilibrium of the saturable reactor SR which continues to limit the current in each of the loops to a constant value, even though one of the input sources has failed. Thus, although the sources are electrically isolated from one another, reliability is provided in that even if one or more of the input sources should become shorted, the overall circuit will quickly compensate for the loss of the shorted sources, a feature found heretofore only in parallel redundant supplies or in nonisolated series supplies.

It should also be noted that regardless of the degree of unbalance among the output voltage levels of the input sources, there is no D.C. components in the A.C. waveforms to cause saturation of either the saturable reactor SR or the output transformer T, since any summation of sinusoids or symmetrical square waves of the same frequency, even if of arbitrary phase, has a net volt-second area of zero over a time interval corresponding to the fundamental period.

The ability of the present invention to continue to supply load current at the same level as if all input sources are operative when one or more of the sources has a short-circuited output can also be explained in terms of the ampere-turns of the output transformer T. Since the cores of transformer T are never driven into saturation and each turn of the secondary winding is wound on each of the primary cores, the following current equations based on the balance of the ampere-turns in an unsaturated core can be written:

$$N_{p1}i_1 = N_s i_L$$
$$N_{pj}i_j = N_s i_L$$
$$N_{pn}i_n = N_s i_L$$

where $N_p$ is the number of primary turns on the winding designated by the second subscript, $i$ is the current flowing in the primary winding designated by the subscript, $N_s$ is the number of turns on the second winding, and $i_L$ is the load current.

As can be seen from these equations, the primary currents $i_1$ through $i_n$ do not combine in porducing the load current but each bears, at all times, a proportionate ratio to the load current determined by the turns ratio of a particular primary winding to the secondary winding. If, as discussed heretofore, one or more of the input A.C. sources should become short-circuited, the current relations noted above still apply, including that associated with the primary winding of the shorted source or sources. The output voltages of the operative sources would, by transformer action, induce a voltage in the shorted sources primary winding to provide a voltage having a negative polarity and a magnitude sufficient to supply the gate voltage of the windings G and G' on saturable reactor SR. If all but one input source should become short-circuited, therefore, the single operative input source would continue to supply the required load current.

Variations in the power being delivered to the load either due to the shorting of an input source or a variation in the load impedance, the latter of which may typically vary from zero to a maximum design value, are inherently compensated for by saturable reactor SR which causes the phase relationship ($\theta$) between the voltage and current in each series loop to be varied accordingly. The phase relationship between the voltage and current in each loop also may be expressed in terms of the power factor of the input source where the power factor (cosine $\theta$, where $\theta$ is the angle by which the voltage leads the current of an individual input A.C. source) may be expressed as average power (measured in watts) to apparent power (measured in volt-amperes) of each loop. The power losses in the present circuit are mainly due to winding resistances and core losses and are, therefore, negligibly small. The excess of input volt-amperes over actual delivered power is returned to the source and determines the power factor of the source. For example, if the action of the saturable reactor should cause the voltage of the input source to lead the current of the source by 90 degrees then the power factor will be zero and no average or actual power will be delivered to the load. On the other hand, if the saturable reactor inherently causes the voltage of the source to be in phase with the current ($\theta = 0$) then the power factor is 1 (unity) and all of the input power will be delivered to the load as actual power. Variations of θ between 0 and 90 degrees represent proportionate adjustments depending on the variations of the particular input source and the load. The phase angle adjustment inherent in the saturable reactor SR when operating in the constrained mode thus provides input source and load impedance variation adjustment or, in other terms, input and output regulation.

Figure 3:
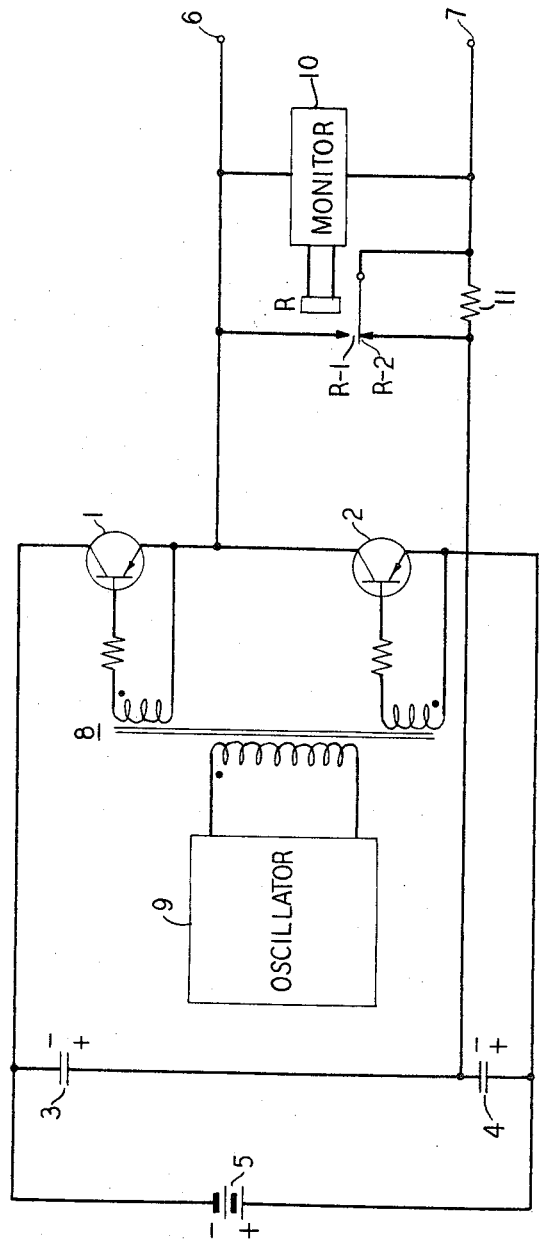
FIG. 3 represents an inverter and monitoring network which may be employed as an input source in the embodiment of FIG. 1.

The A.C. input sources 1 through n may be virtually any A.C. source such as, for example, an A.C. to D.C. inverter. FIG. 3 illustrates one such inverter which may be employed. In the inverter of FIG. 3, the collector-emitter paths of transistors 1 and 2 and capacitors 3 and 4 are connected as a bridge inverter. The input terminals of the bridge are connected to a source of D.C. input potential 5 while the output terminals of the bridge are connected to the source output terminals 6 and 7. These output terminals are shown in FIG. 1 in connection with input A.C. source j. The base-emitter electrodes of transistors 1 and 2 are driven alternately into conduction by the A.C. signal induced in transformer 8 by oscillator 9. Oscillator 9 may be any continuously oscillating type of circuit such as, for example, a bistable multivibrator. A monitoring circuit 10 is connected across the output terminals 6 and 7.

As noted, the oscillator 9 of FIG. 3 will drive transistors 1 and 2 alternately into conduction. When transistor 2 is conductive, current will flow from the positive terminal of the source 5 through the emitter-collector path of transistor 2, through the load connected to the output terminals 6 and 7, and through capacitor 3 back to the negative terminal of the source 5. Capacitor 3 will thus be charged with a potential having the polarity shown on the drawing. During the subsequent interval, transistor 1 will be conductive and current will flow from the positive terminal of the source 5, through capacitor 4, through the load connected to output terminals 7–6, and through the emitter-collector path of transistor 1 back to the negative terminal of the source 5. Capacitor 4 is thus charged to the potential of the polarity shown in the drawing. During the interval that transistor 1 is conductive, capacitor 3 will discharge the energy stored therein through the load connected to the terminals 7–6 via the emitter-collector path of transistor 1. Conversely, during the interval that transistor 2 is conductive, capacitor 4 will discharge the energy stored therein through the load connected to output terminals 6–7 via the emitter-collector path of transistor 2. The voltage across output terminals 6–7 will thus be extended to a potential in excess of the potential of the input source 5.

When considering FIG. 3 in connection with FIG. 1, it should be noted that the isolation inherent in the series loop and structure of saturable reactor SR and output transformer T makes the elimination of the output transformer normally found in an inverter possible. The cost of output transformer T is, therefore, roughly compensated for by the elimination of the inverter transformers.

As noted heretofore, a high-low voltage monitor 10 is connected across the output terminals 6 and 7, as shown in FIG. 3, to detect output voltage or current variations above or below predetermined high and low levels. Upon detection of a variation above or below the predetermined levels, the monitor will cause relay R to operate. When relay R operates, contact R1 is closed to short-circuit input source terminals 6 and 7, and contact R2 is opened to effectively connect impedance 11 across the output terminals and thereby prevent short-circuit damage to the inverter components. As discussed heretofore in connection with FIG. 1, the present power supply system automatically adjusts for a short-circuited input source without the destructive and/or noise introducing transients normally found in the series and parallel combination circuits of the prior art. The monitor 10 may be any such high-low detection monitor as for example, the one described in copending application of S. J. Brolin, Ser. No. 420,325, filed Dec. 22, 1964, and assigned to the same assignee as the present invention.

The relay R of FIG. 3 would be connected in place of the indicator 15 of the Brolin application.

In conclusion, then, the present invention provides a constant current power supply which utilizes a plurality n of input sources each serially connected with a pair of gate windings, wound on a series saturable reactor operated in the constrained mode, and a primary winding, wound on an individual core of the output transformer, to combine as many A.C. power sources as may be necessary to sustain the required constant output current over an extreme load range. The interaction of the saturable reactor and the output transformer insures equal load sharing by the sources and provides electrical isolation, and substantial transient reduction, between the input sources. Moreover, this interaction of the saturable reactor and output transformer is such that in the event of a short-circuit across the output terminals of one or more of the input sources, then the remaining nonshorted input sources will continue to supply the same magnitude of load current as if all of the input sources were functioning normally.

The above-described arrangement is illustrative of the principles of the invention. Other embodiments may be devised by those skilled in the art without departing from the spirit and scope of the invention.

What is claimed is:

1. A power supply comprising n alternating current input sources, a saturable reactor having a control winding and 2n gate windings, an output transformer having n primary windings each wound on an individual core and a secondary winding wound on each of said individual cores, a control signal source connected to said control winding, a load connected to said secondary winding, an n individual serial paths each including an individual one of said input sources, an individual two of said gate windings, and an individual one of said primary windings, whereby a series connection of said input sources is simulated while maintaining electrical isolation between said input sources.

2. A power supply in accordance with claim 1 wherein an inductor is serially connected with said control source and said control winding to limit the operation of said saturable reactor to the constrained mode.

3. A power supply in accordance with claim 1 wherein said saturable reactor has two cores and one of said two gate windings in each of said serial paths is wound about one core while the other of said two gate windings is wound about the remaining core.

4. A power supply in accordance with claim 1 wherein said n alternating current input sources have dissimilar output voltage and current levels, and means for adjusting the effective turns of said gate and said primary windings to compensate for said dissimilar source levels.

5. A power supply in accordance with claim 1 wherein each of said n alternating current input sources comprises a two-transistor inverter having the output electrodes of its transistors connected in a direct current path with said gate and said primary windings.

6. A power supply in accordance with claim 1 wherein an individual high-low signal monitor with fail-short means is connected across the output of each of said n alternating current input sources to short-circuit the output of the source with which it is associated in the event of an output level higher or lower than predetermined limits.

7. The power supply in accordance with claim 6 wherein said n input alternating current sources each include an inverter comprising first and second transistors having base, collector, and emitter electrodes, first and second capacitors connected in a bridge configuration with the collector-emitter electrodes of said first and second transistors, means connecting the base and emitter electrodes of said first and second transistors to a source of alternating potential so that said first and said second transistors are conductive for alternate intervals, an input source of potential connected to the input terminals of said bridge configuration, impedance means serially connected with the output terminals of said bridge configuration and said monitor, said monitor including means for inserting said impedance means across said output terminals when said monitor responds to an output level higher or lower than said predetermined limits.

References Cited

UNITED STATES PATENTS

| 2,991,409 | 7/1961 | Bennett | 323—89 |
| 3,054,944 | 9/1962 | Brooke et al. | 323—89 |

ROBERT K. SCHAEFER, *Primary Examiner.*

H. J. HOHAUSER, *Assistant Examiner.*